US011126844B2

(12) United States Patent
Hayashi et al.

(10) Patent No.: US 11,126,844 B2
(45) Date of Patent: Sep. 21, 2021

(54) CONTROL APPARATUS, ROBOT SYSTEM, AND METHOD OF DETECTING OBJECT

(71) Applicant: Seiko Epson Corporation, Tokyo (JP)

(72) Inventors: Masaki Hayashi, Matsumoto (JP); Tomonori Mano, Shiojiri (JP)

(73) Assignee: Seiko Epson Corporation

( * ) Notice: Subject to any disclaimer, the term of this patent is extended or adjusted under 35 U.S.C. 154(b) by 216 days.

(21) Appl. No.: 16/296,320

(22) Filed: Mar. 8, 2019

(65) Prior Publication Data
US 2019/0278991 A1    Sep. 12, 2019

(30) Foreign Application Priority Data

Mar. 9, 2018  (JP) .............................. JP2018-042505

(51) Int. Cl.
| G06K 9/00 | (2006.01) |
| B25J 9/16 | (2006.01) |
| G06T 7/593 | (2017.01) |

(52) U.S. Cl.
CPC ........ *G06K 9/00664* (2013.01); *B25J 9/1697* (2013.01); *G06T 7/593* (2017.01); *G06T 2207/10028* (2013.01)

(58) Field of Classification Search
CPC ..... G06K 9/00664; G06T 7/593; B25J 9/1697
See application file for complete search history.

(56) References Cited

U.S. PATENT DOCUMENTS

| 9,630,324 B2 * | 4/2017 | Cohen .................... B25J 13/006 |
| 10,115,007 B2 * | 10/2018 | Painter ...................... G06K 9/46 |
| 10,198,533 B2 * | 2/2019 | Zeisl .......................... G06T 7/33 |
| 10,369,701 B1 * | 8/2019 | Diankov .............. B25J 15/0052 |

(Continued)

FOREIGN PATENT DOCUMENTS

| JP | 2009-042015 A | 2/2009 |
| JP | 2017-182274 A | 10/2017 |

OTHER PUBLICATIONS

Drost, Bertram et al.: "Model Globally, Match Locally: Efficient and Robust 3D Object Recognition"; Jun. 13, 2010; http://campar.in.tum.de/pub/drost2010CVPR/drost2010CVPR.pdf. (8 pages).

(Continued)

*Primary Examiner* — Mia M Thomas
(74) *Attorney, Agent, or Firm* — Harness, Dickey & Pierce, P.L.C.

(57) ABSTRACT

A control apparatus includes a processor that executes a first point cloud generation process including a first imaging process of acquiring a first image according to a first depth measuring method and a first analysis process of generating a first point cloud and a second point cloud generation process including a second imaging process of acquiring a second image according to a second depth measuring method and a second analysis process of generating a second point cloud, and detects the object using the first point cloud or the second point cloud. The first point cloud generation process completes in a shorter time than the second point cloud generation process, and the processor starts the second point cloud generation process after the first imaging process and discontinues the second point cloud generation process if the first point cloud satisfies a predetermined condition of success.

15 Claims, 10 Drawing Sheets

(56) References Cited

U.S. PATENT DOCUMENTS

| | | | |
|---|---|---|---|
| 2010/0194855 A1 | 8/2010 | Mamiya | |
| 2015/0254499 A1* | 9/2015 | Pang | G06T 7/001 382/103 |
| 2016/0214255 A1* | 7/2016 | Uhlenbrock | B25J 9/1697 |
| 2017/0286750 A1 | 10/2017 | Levinshtein et al. | |
| 2018/0259339 A1* | 9/2018 | Johnson | H04N 5/23258 |
| 2019/0122425 A1* | 4/2019 | Sheffield | G06T 7/586 |
| 2019/0224847 A1* | 7/2019 | Mori | G06T 7/73 |
| 2019/0287258 A1* | 9/2019 | Mano | G06T 7/521 |
| 2019/0392213 A1* | 12/2019 | Ulbricht | G06T 7/70 |
| 2020/0025935 A1* | 1/2020 | Liang | G06K 9/629 |
| 2020/0156251 A1* | 5/2020 | Huang | B25J 9/1697 |
| 2020/0193619 A1* | 6/2020 | Danielsson | G06T 7/292 |
| 2020/0290208 A1* | 9/2020 | Ha | B25J 9/1697 |
| 2020/0364892 A1* | 11/2020 | Ko | G06T 7/248 |
| 2020/0376675 A1* | 12/2020 | Bai | G06T 7/73 |

OTHER PUBLICATIONS

Akizuki, Shuichi: "High Reliable Three-Dimensional Position Attitude Recognition by Vector Pair Matching"; Chukyo University Graduate School; Information Science Research Department; Sep. 1, 2013; http://isl.sist.chukyo-u.ac.jp/Archives/vpm.pdf. (23 pages).

* cited by examiner

<SECOND POINT CLOUD GENERATION PROCESS USING PHASE SHIFTING METHOD>

CONTROL APPARATUS, ROBOT SYSTEM, AND METHOD OF DETECTING OBJECT

BACKGROUND

1. Technical Field

The present invention relates to an object detection technique using a camera.

2. Related Art

In various apparatuses including robots, object detection techniques of detecting three-dimensional objects are used. As one of the object detection techniques, a method of measuring the depth of an object using an image captured by a camera is used. As methods of measuring the depth, the stereo block matching method, phase shifting method, spatial coding method, etc. are known. In these methods, an image is analyzed and a point cloud is captured for object detection. "Point cloud" refers to a collection of points representing a position in three-dimensional coordinates and a collection of points estimated to form a contour of an object. The stereo block matching method can make a depth measurement by at least single imaging, but has lower position accuracy of the point cloud than the other methods. On the other hand, the phase shifting method and the spatial coding method require imaging at a plurality of times, but can generate high-accuracy point clouds.

Patent Document 1 (JP-A-2009-42015) discloses a technique of increasing the measurable height range and realizing high-accuracy measurement by combining two depth measuring methods of the phase shifting method and the spatial coding method.

However, in the above described related art, there is a problem that a longer time is required until the entire process is completed.

SUMMARY

According to one aspect of the invention, a control apparatus that executes detection of an object is provided. The control apparatus has a first point cloud generation part that executes a first point cloud generation process including a first imaging process of capturing a first image by imaging the object with a camera according to a first depth measuring method and a first analysis process of generating a first point cloud representing positions of a plurality of pixels within the first image in three-dimensional coordinates, a second point cloud generation part that executes a second point cloud generation process including a second imaging process of capturing a second image by imaging the object with the camera according to a second depth measuring method and a second analysis process of generating a second point cloud representing positions of a plurality of pixels within the second image in the three-dimensional coordinates, and an object detection execution part that detects the object using the first point cloud or the second point cloud. The first point cloud generation process is a process completed in a shorter time than the second point cloud generation process, and the second point cloud generation part starts the second point cloud generation process after the first imaging process by the first point cloud generation part and stops the second point cloud generation process if the first point cloud obtained in the first analysis process satisfies a predetermined condition of success.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
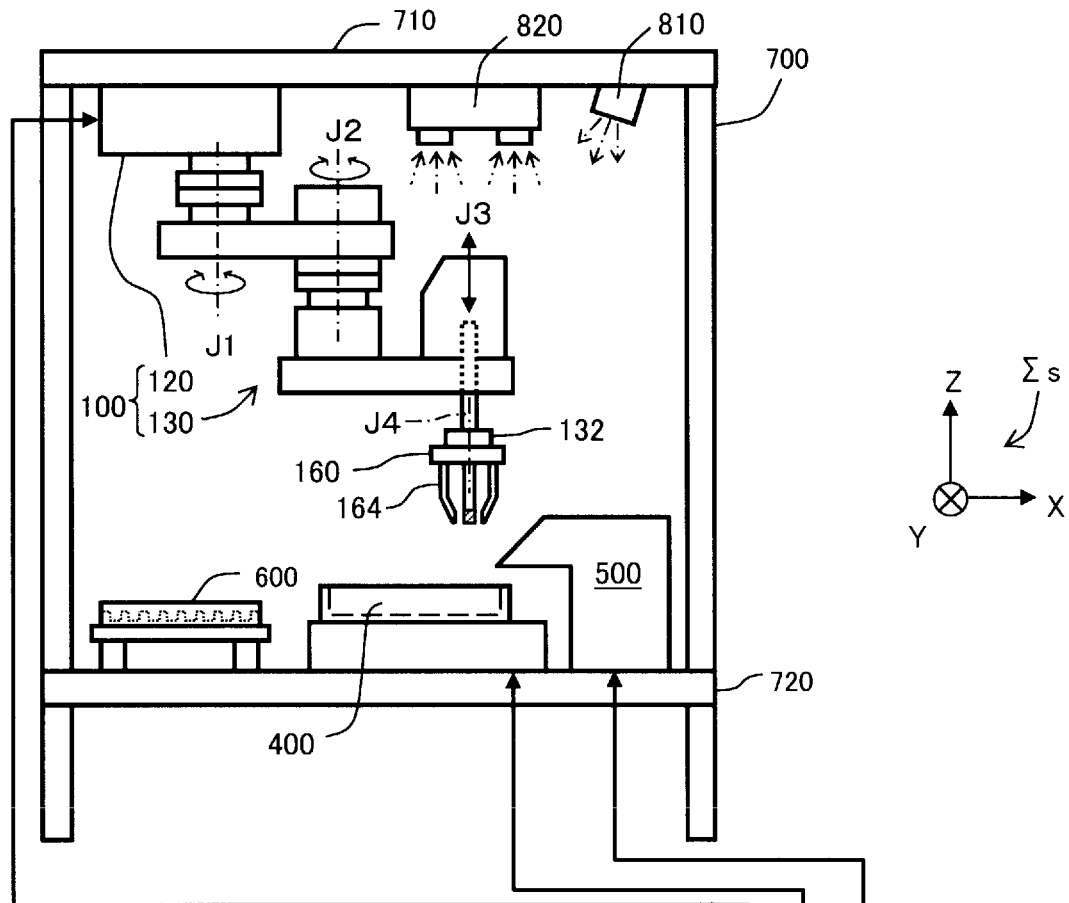
FIG. 1 is a conceptual diagram of a robot system.
Figure 1:
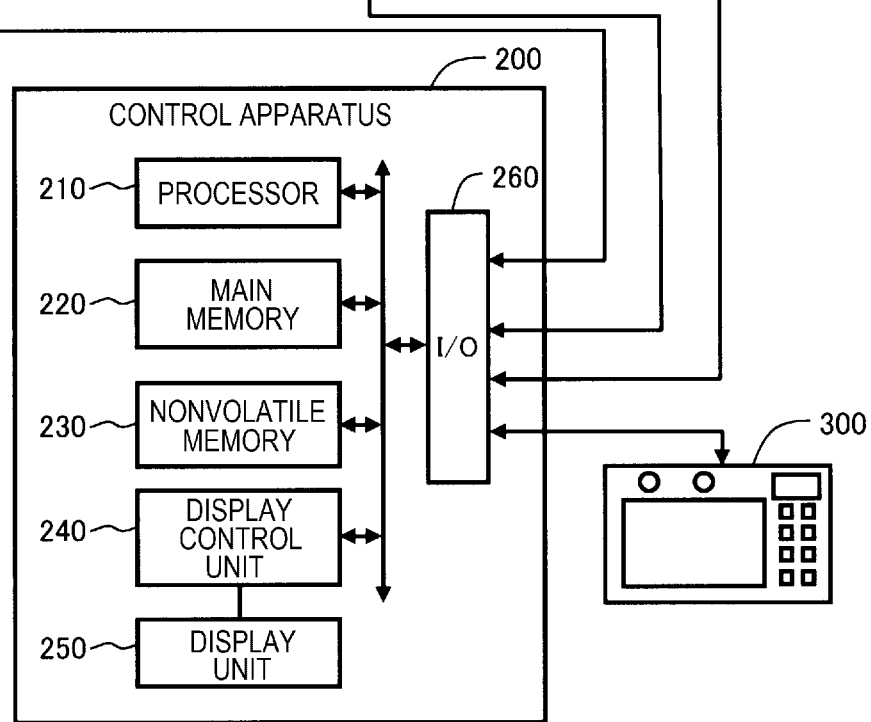

FIG. 1 is a conceptual diagram of a robot system. The robot system is installed on a rack 700 and includes a robot 100, a control apparatus 200 connected to the robot 100, a teaching pendant 300, a parts feeder 400, a hopper 500, a parts tray 600, a projection device 810, and a camera 820. The robot 100 is fixed under a top plate 710 of the rack 700. The parts feeder 400, the hopper 500, and the parts tray 600 are mounted on a table part 720 of the rack 700. The robot 100 is a robot of a teaching playback system. The work using the robot 100 is executed according to teaching data created in advance. In the robot system, a system coordinate system Σs defined by three orthogonal coordinate axes X, Y, Z is set. In the example of FIG. 1, the X-axis and the Y-axis extend in horizontal directions and the Z-axis extends in the vertical upward direction. Taught points contained in teaching data and attitudes of end effectors are represented by coordinate values of the system coordinate system Σs and angles about the respective axes.

The robot 100 includes a base 120 and an arm 130. The arm 130 is sequentially connected by four joints J1 to J4. Of these joints J1 to J4, three joints J1, J2, J4 are twisting joints and one joint J3 is a translational joint. In the embodiment, the four-axis robot is exemplified, however, a robot having an arbitrary arm mechanism with one or more joints can be used.

An end effector 160 is attached to an arm flange 132 provided in the distal end part of the arm 130. In the example of FIG. 1, the end effector 160 is a gripper that grips and lifts a part using a gripping mechanism 164. Note that, as the end effector 160, another mechanism such as a suction pickup mechanism can be attached.

The parts feeder 400 is a container device that contains parts to be gripped by the end effector 160. The parts feeder 400 may be formed to have a vibration mechanism for vibrating parts and distributing the parts. The hopper 500 is a parts supply device that supplies parts to the parts feeder 400. The parts tray 600 is a tray having many recessed portions for individually holding the parts. In the embodiment, the robot 100 executes work of picking up the parts from the inside of the parts feeder 400 and placing the parts in appropriate positions within the parts tray 600. Note that the robot system can be applied to execution of other work.

The control apparatus 200 has a processor 210, a main memory 220, a nonvolatile memory 230, a display control unit 240, a display unit 250, and an I/O interface 260. These respective parts are connected via a bus. The processor 210 is e.g. a microprocessor or a processor circuit. The control apparatus 200 is connected to the robot 100, the teaching pendant 300, the parts feeder 400, and the hopper 500 via the I/O interface 260. The control apparatus 200 is further connected to the projection device 810 and the camera 820 via the I/O interface 260.

As the configuration of the control apparatus 200, other various configurations than the configuration shown in FIG. 1 may be employed. For example, the processor 210 and the main memory 220 may be removed from the control apparatus 200 in FIG. 1, and the processor 210 and the main memory 220 may be provided in another apparatus communicably connected to the control apparatus 200. In this case, a whole apparatus including the other apparatus and the control apparatus 200 functions as the control apparatus of the robot 100. In another embodiment, the control apparatus 200 may have two or more processors 210. In yet another embodiment, the control apparatus 200 may be realized by a plurality of apparatuses communicably connected to one another. In these various embodiments, the control apparatus 200 is formed as an apparatus or a group of apparatuses including one or more processors 210.

Figure 2:
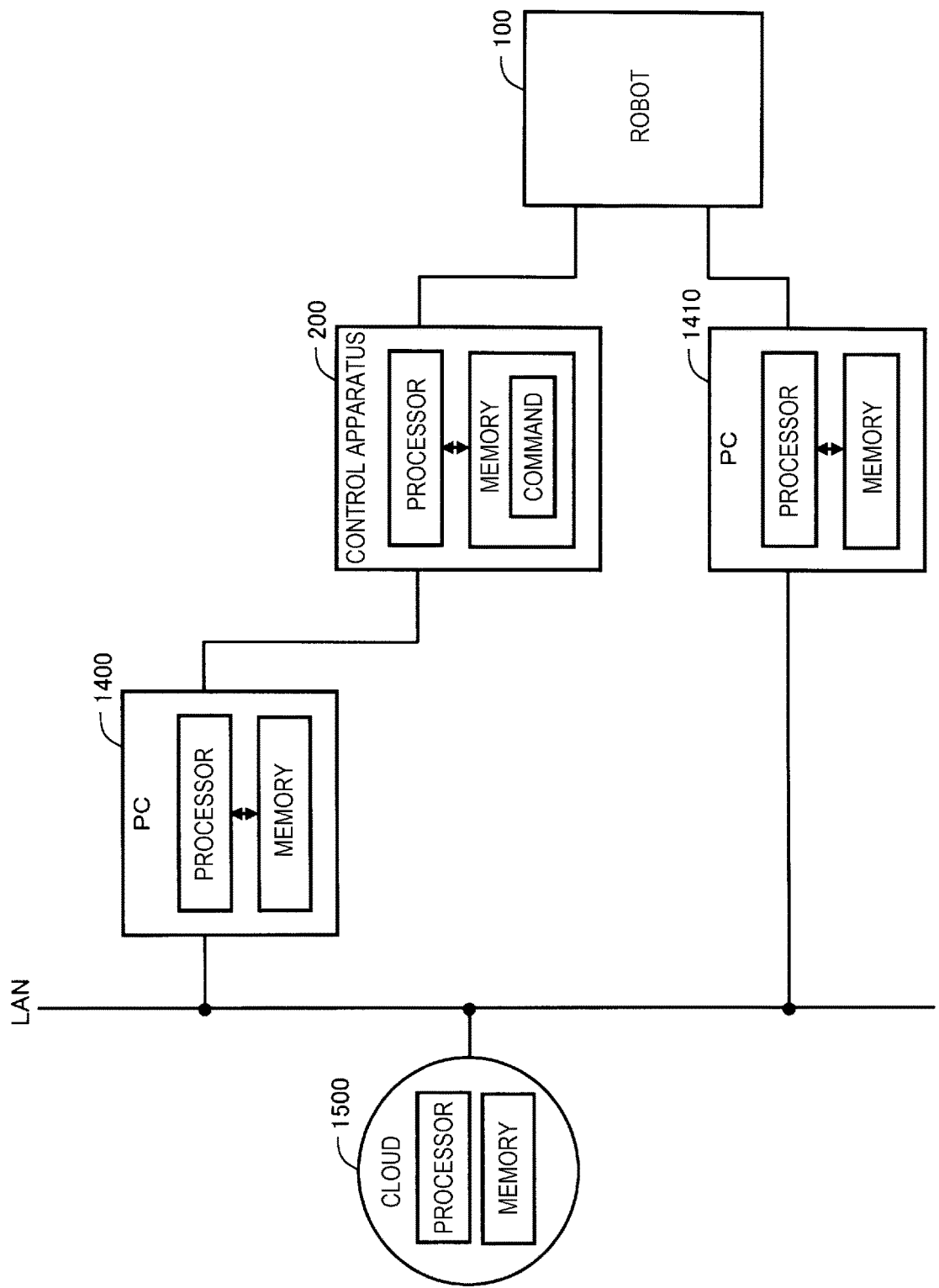
FIG. 2 is a conceptual diagram showing an example of a control apparatus having a plurality of processors.

FIG. 2 is a conceptual diagram showing an example of a control apparatus having a plurality of processors. In the example, in addition to the robot 100 and the control apparatus 200 thereof, personal computers 1400, 1410 and a cloud service 1500 provided via a network environment such as LAN are drawn. Each of the personal computers 1400, 1410 includes a processor and a memory. Also, in the cloud service 1500, a processor and a memory can be used. The control apparatus of the robot 100 can be realized using part or all of the plurality of processors.

Figure 3:
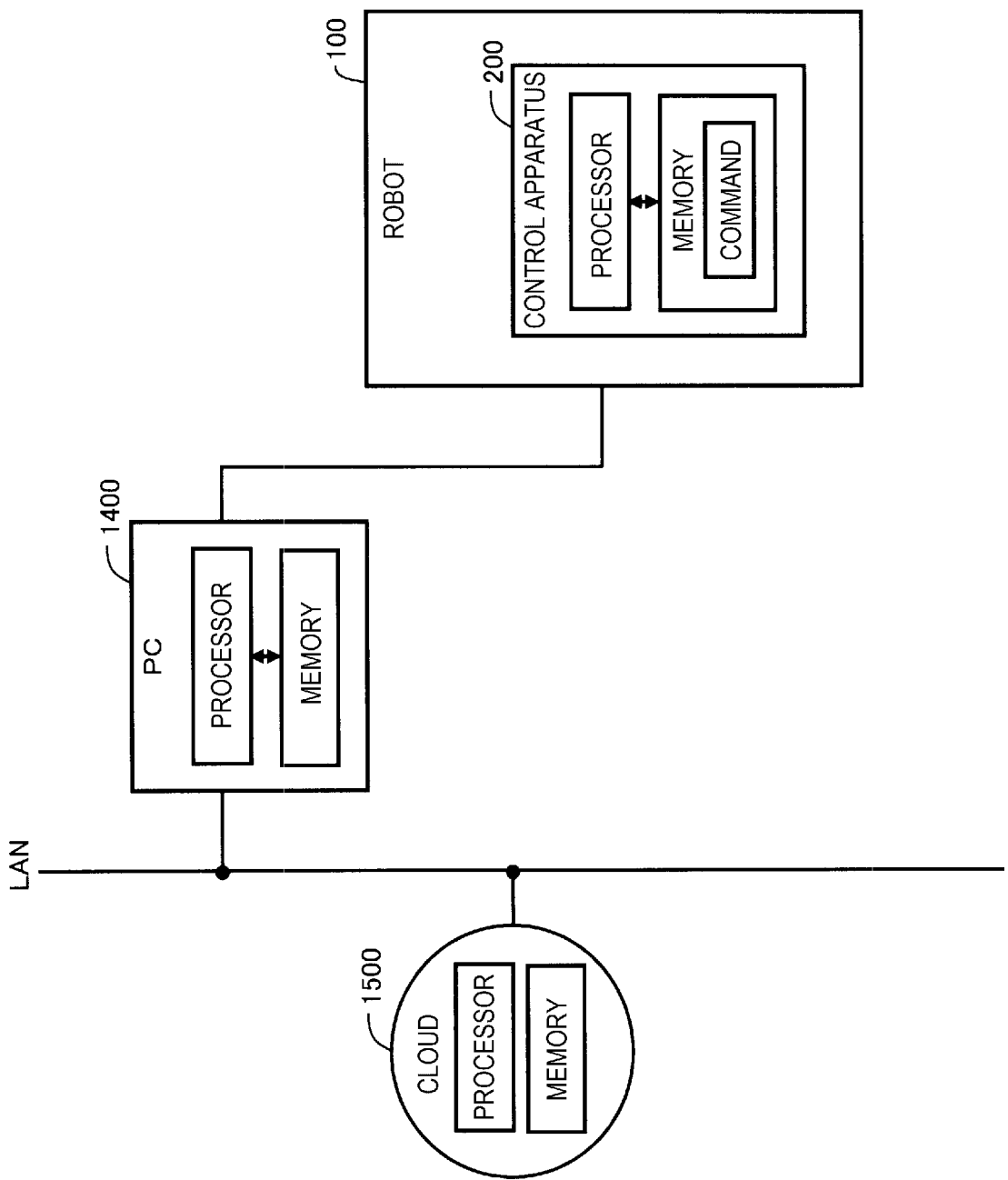
FIG. 3 is a conceptual diagram showing another example of the control apparatus having a plurality of processors.

FIG. 3 is a conceptual diagram showing another example of the control apparatus having a plurality of processors. In the example, the control apparatus 200 of the robot 100 is different from that in FIG. 2 in that the control apparatus is housed in the robot 100. Also, in the example, the control apparatus of the robot 100 can be realized using part or all of the plurality of processors.

Figure 4:
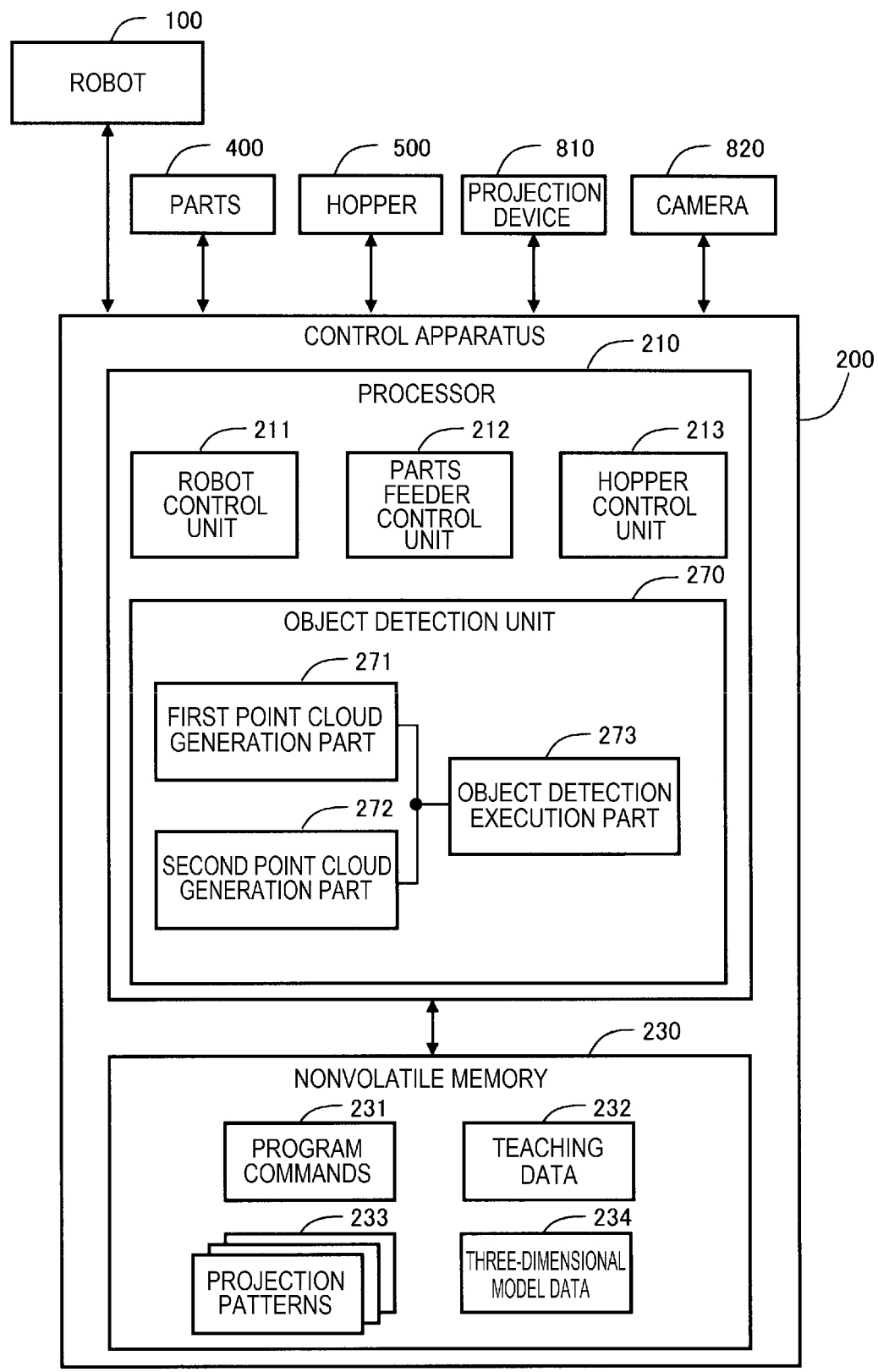
FIG. 4 is a block diagram showing functions of the control apparatus.

FIG. 4 is a block diagram showing functions of the control apparatus 200. The processor 210 of the control apparatus 200 executes various program commands 231 stored in the nonvolatile memory 230 in advance, and thereby, respectively realizes the functions of a robot control unit 211, a parts feeder control unit 212, a hopper control unit 213, and an object detection unit 270.

The object detection unit 270 includes a first point cloud generation part 271 and a second point cloud generation part 272 that generate point clouds using images captured by the camera 820, and an object detection execution part 273 that detects the object using the generated point clouds. The functions of these respective parts will be described later.

The nonvolatile memory 230 stores various projection patterns 233 to be used for capturing of the images and three-dimensional model data 234 of object to be used for object detection in addition to the program commands 231 and teaching data 232.

Figure 5:
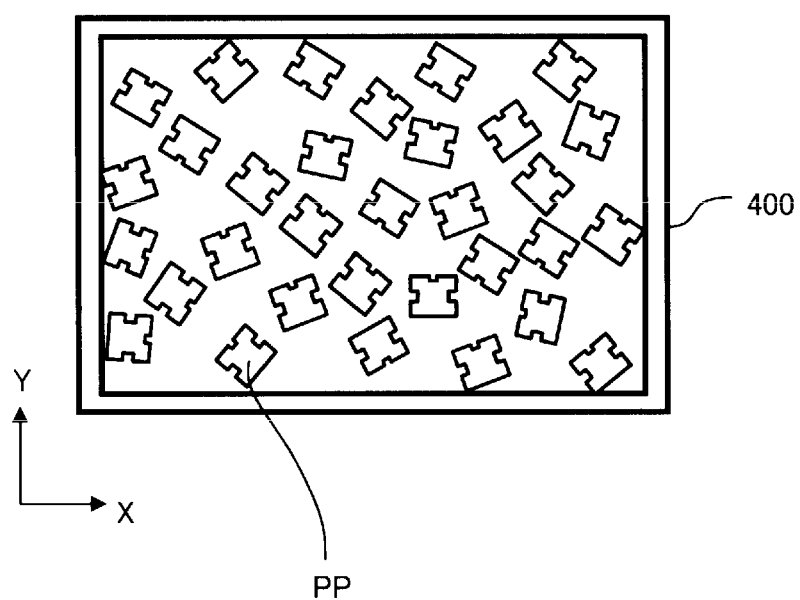
FIG. 5 is a plan view showing a plurality of parts held in a parts feeder.

FIG. 5 is a plan view showing a plurality of parts PP held in the parts feeder 400. In the embodiment, an object detection process of imaging the plurality of the same parts PP with the camera 820 and detecting the parts PP by analyzing the image is executed. The detected parts PP can be gripped by the end effector 160. Hereinafter, the parts PP are also referred to as "objects PP". Note that the object detection process may be used for other purposes than the robot.

In the embodiment, the camera 820 is a stereo camera. The projection device 810 is provided for radiating a specific projection pattern when the parts PP are imaged using the camera 820. Examples of the projection patterns will be described later.

For the object detection process of the embodiment, two kinds of point cloud generation processes, which will be described later, are used. "Point cloud" refers to a collection of point data of the positions of the pixels of the image represented by the three-dimensional coordinate values X [mm], Y [mm], Z [mm]. As the three-dimensional coordinate system, an arbitrary coordinate system including a camera coordinate system, the system coordinate system Σs, and a robot coordinate system may be used.

Figure 6:
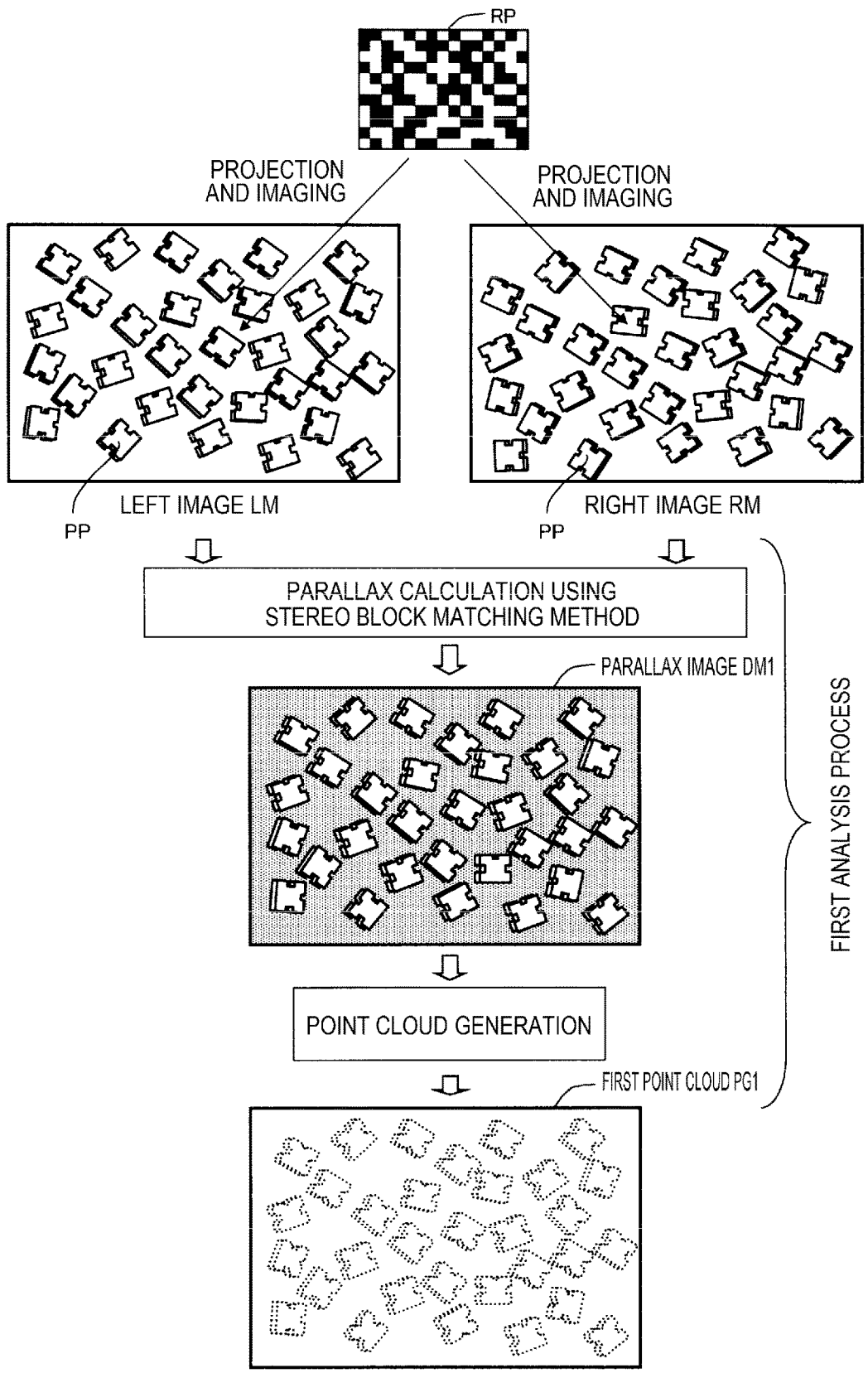
FIG. 6 is an explanatory diagram of a first point cloud generation process.

FIG. 6 is an explanatory diagram of the first point cloud generation process executed by the first point cloud generation part 271. In the embodiment, in the first point cloud generation process, the stereo block matching method is used as a depth measuring method of measuring a depth of pixels of an image. "Depth" refers to a distance from the camera 820.

In the first point cloud generation process, first, a first imaging process of imaging a left image LM and a right image RM as stereo images containing parts PP is performed. In the first embodiment, imaging is performed with a random dot pattern RP as a projection pattern projected on the parts PP using the projection device 810. In FIG. 6, for convenience of illustration, the pixels of the random dot pattern RP are drawn relatively largely, however, actually, the random dot pattern RP is formed by pixels sufficiently smaller than the sizes of the parts PP. The random dot pattern RP is used for facilitating measurement of the depth of the parts PP by providing texture to the surfaces of the parts PP. The image of the parts PP is imaged with the random dot pattern RP projected on the parts PP, and thereby, the point clouds may be captured with higher accuracy. Note that the projection of the random dot pattern RP may be omitted.

In the first point cloud generation process, then, a first analysis process is executed using the left image LM and the right image RM, and thereby, a first point cloud PG1 is generated. In the first analysis process, first, parallax is calculated according to the stereo block matching method using the left image LM and the right image RM, and thereby, a parallax image DM1 is generated.

The parallax image DM1 is an image having pixel values representing horizontal parallax of the stereo camera 820. The relationship between parallax D and a distance Z to the stereo camera 820 is given by the following expression $$Z = f \times T / D \quad (1)$$

where f is a focal length of the camera, and T is a distance between optical axes of two cameras forming the stereo camera 820.

Note that preprocesses may be performed on the left image LM and the right image RM before the parallax calculation by the stereo block matching method. As the preprocesses, e.g. distortion correction of correcting distortion of the image due to lenses and geometrical correction including a parallelizing process of parallelizing the orientations of the left image LM and the right image RM are performed.

In the first analysis process, then, the first point cloud PG1 is generated from the parallax image DM1. In this regard, the distance Z calculated according to the expression (1) from the parallax D of the parallax image DM1 is used. As described above, "point cloud" is the collection of point data of the positions of the pixels of the image represented by the three-dimensional coordinate values X [mm], Y [mm], Z [mm]. Note that the point cloud generation process using the parallax D of the parallax image DM1 or distance Z is well known, and the explanation thereof is omitted here.

Figure 7:
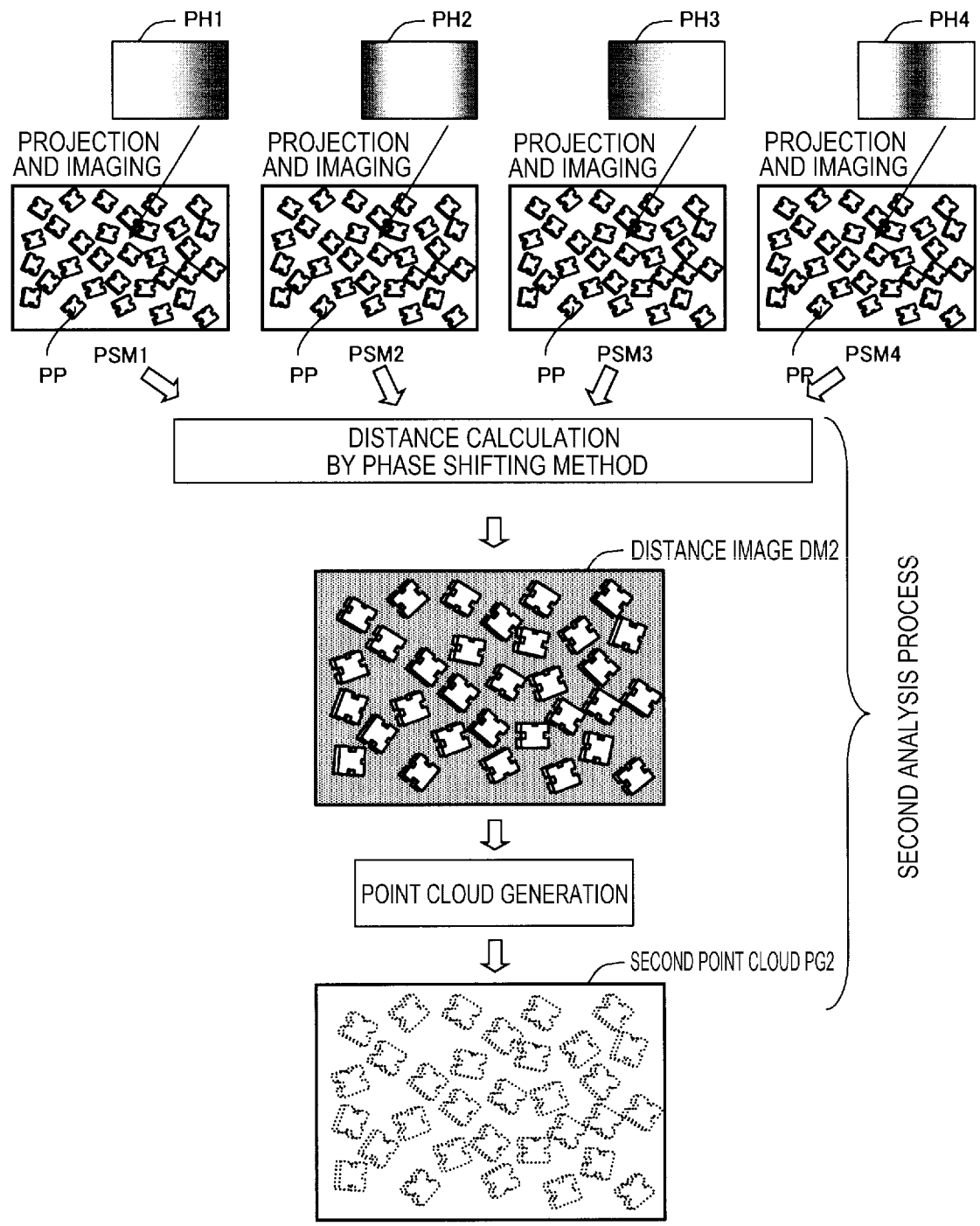
FIG. 7 is an explanatory diagram of a second point cloud generation process.

FIG. 7 is an explanatory diagram of a second point cloud generation process executed by the second point cloud generation part 272. In the embodiment, in the second point cloud generation process, the phase shifting method is used as a depth measuring method of measuring a depth of pixels of an image. Note that, in place of the phase shifting method, another depth measuring method such as the spatial coding method can be used. As is well known, both the phase shifting method and the spatial coding method are the depth measuring methods using a plurality of images obtained by imaging at a plurality of times while radiating a plurality of projection patterns on the object one by one.

In the second point cloud generation process, first, a second imaging process of imaging a plurality of phase shifting images PSM1 to PSM4 containing the parts PP with a plurality of phase shifting patterns PH1 to PH4 selectively projected one by one as the projection patterns is performed using the projection device 810. The plurality of phase shifting patterns PH1 to PH4 are sinusoidal banded patterns having dark and light parts. In the phase shifting method, generally, capturing of images is performed using the n phase shift patterns PH1 to PHn for n (integer) equal to or larger than three. The n phase shift patterns PH1 to PHn are sinusoidal patterns having phase sequentially shifted by $2\pi/n$. In the example of FIG. 7, n=4. Note that, in the phase shifting method, it is not necessary to use the stereo camera, and only one of the two cameras forming the stereo camera may be used for imaging.

In the second point cloud generation process, then, a second analysis process is executed using the plurality of phase shifting images PSM1 to PSM4, and thereby, a second point cloud PG2 is generated. In the second analysis process, first, a distance image DM2 is generated according to the phase shifting method using the plurality of phase shifting images PSM1 to PSM4. The generation process of the distance image DM2 using the phase shifting method is well known, and the explanation thereof is omitted here. In the second point cloud generation process, a second point cloud PG2 is further generated using the distance image DM2.

Note that, in the second point cloud generation process, it is necessary to perform the second imaging process of imaging the plurality of phase shifting images PSM1 to PSM4 with the plurality of phase shifting patterns PH1 to PHn selectively projected one by one, and the process takes the longer process time compared to the first point cloud generation process requiring only single imaging. The same applies to the spatial coding method. The process procedure of the object detection process to be described later is adapted to shorten the entire process time.

Figure 8:
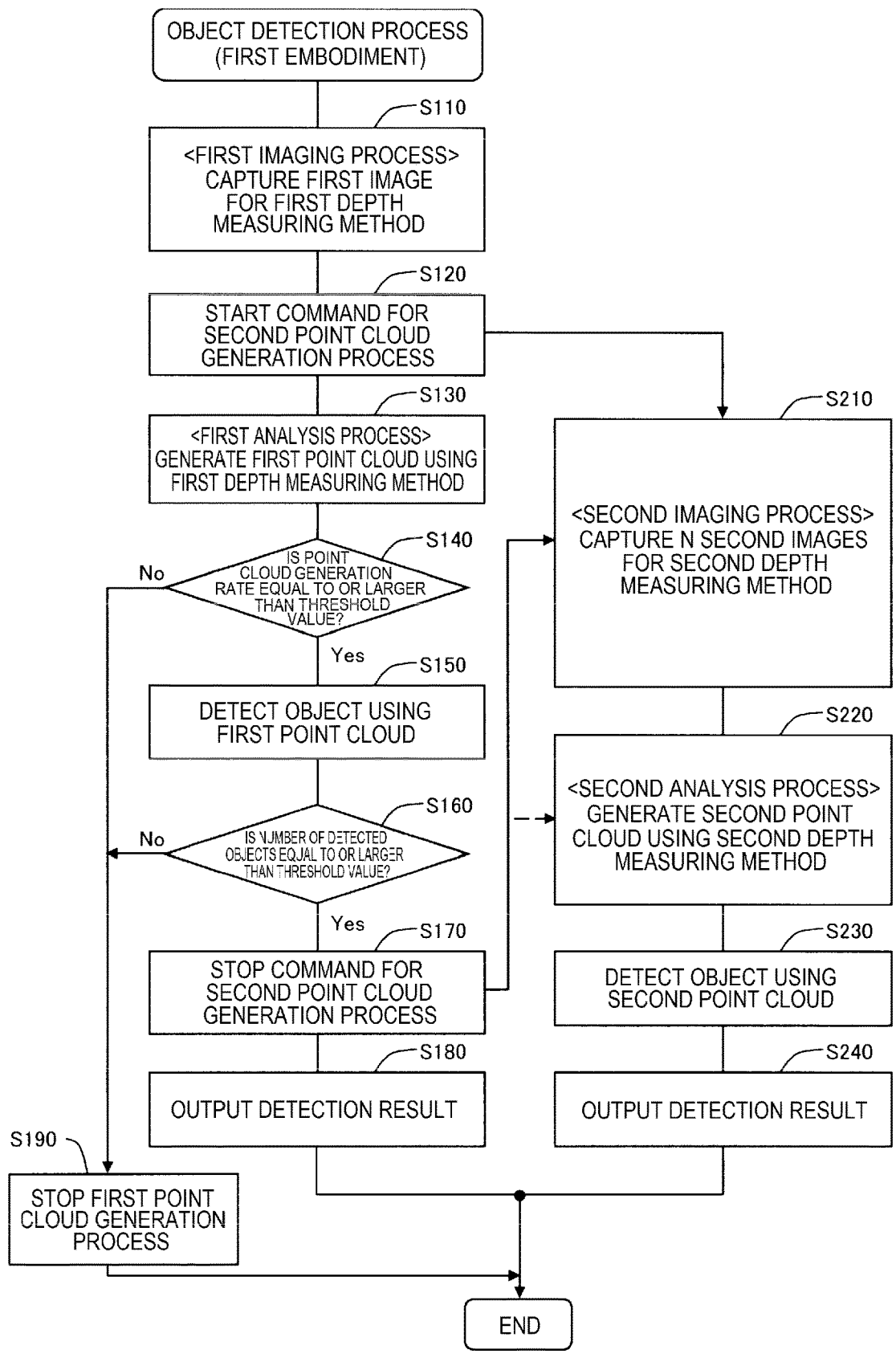
FIG. 8 is a flowchart showing a procedure of an object detection process in the first embodiment.

FIG. 8 is a flowchart showing the procedure of the object detection process in the first embodiment. The process is executed by the object detection unit 270.

At step S110, the first point cloud generation part 271 executes the first imaging process of imaging the first image for the first depth measuring method using the camera 820. In the embodiment, the first depth measuring method is the stereo block matching method and, at step S110, the left image LM and the right image RM described in FIG. 6 are captured as the first images. At step S120, the first point cloud generation part 271 issues a start command of the second point cloud generation process to the second point cloud generation part 272.

When receiving the start command, the second point cloud generation part 272 moves to step S210, and starts the second point cloud generation process described in FIG. 7. That is, n second images are imaged for the phase shifting method as the second depth measuring method at step S210 and the second analysis process using the phase shifting method is executed at step S220, and thereby, the second point cloud PG2 is created.

After the start command of the second point cloud generation process is issued, the first point cloud generation part 271 continues the first point cloud generation process. That is, at step S130, the first analysis process using the stereo block matching method is executed, and thereby, the first point cloud PG1 is generated.

At step S140, the first point cloud generation part 271 determines whether or not a point cloud generation rate of the first point cloud is equal to or larger than a predetermined threshold value. Here, "point cloud generation rate" refers to a value obtained by division of the number of points contained in the first point cloud PG1 by the number of pixels of the image. "Number of pixels of image" refers to the number of pixels of the image used as the reference image when the parallax image DM1 is created of the left image LM and the right image RM. The points contained in the point cloud are pixels that may determine the three-dimensional coordinate values X [mm], Y [mm], Z [mm] from the parallax image DM1, and the number of the points is usually smaller than the number of pixels of the original image. If the point cloud generation rate of the first point cloud PG1 is less than the threshold value, it may be impossible to perform the object detection with sufficient accuracy using the first point cloud PG1. Accordingly, in this case, the first point cloud generation process is stopped at step S190.

At step S190, if the first point cloud generation part 271 stops the process, the second point cloud generation part 272 continues execution of the second point cloud generation process. Then, at step S230, the object detection execution part 273 detects the three-dimensional shapes of the parts PP as objects using the second point cloud PG2.

As the method of detecting the three-dimensional shapes of the objects using the point cloud, e.g. the method described in JP-A-2017-182274 disclosed by the applicant of this application can be used. Or, the method described in "Model Globally, Match Locally: Efficient and Robust 3D Object Recognition", Bertram Drost et al., http://campar.in-.tum.de/pub/drost2010CVPR/drost2010CVPR.pd f, the method described in "Bekutoru Pea Mattingu niyoru Kousinraina Sanjigen Ichi Shisei Ninshiki", Shuichi Akizuki, http://isl.sist.chukyo-u.ac.jp/Archives/vpm.pdf, or the like may be used. These methods are object detection methods using the point cloud and the three-dimensional model data of the objects. Note that the three-dimensional shapes of the objects may be detected from the point cloud without using the three-dimensional model data.

At step S240, the object detection unit 270 outputs the detection result obtained at step S230. Specifically, for example, the detection result of the parts PP as the objects is provided from the object detection unit 270 to the robot control unit 211, and the robot control unit 211 executes the gripping operation of the parts PP using the detection result.

On the other hand, at step S140, if the determination that the point cloud generation rate of the first point cloud PG1 is equal to or larger than the threshold value is made, it may be considered that the generation of the first point cloud PG1 is successful. Further, it may be possible to perform object detection with sufficient accuracy using the first point cloud PG1. Accordingly, in this case, at step S150, the object detection execution part 273 detects the three-dimensional shapes of the parts PP as the objects using the first point cloud PG1.

At step S160, the first point cloud generation part 271 determines whether or not the number of detected objects detected at step S150 is equal to or larger than a predetermined number of detected objects. Here, "number of detected objects" refers to the number of objects having the detected three-dimensional shapes. In the case of the process of detecting the plurality of parts PP as objects as shown in FIG. 5, the number of parts PP having the detected three-dimensional shapes is "number of detected objects". If the number of detected objects is equal to or larger than a threshold value, it may be considered that the object detection using the first point cloud PG1 is performed with sufficient accuracy and the object detection using the first point cloud PG1 successful. Accordingly, in this case, at step S170, the first point cloud generation part 271 issues a stop command of the second point cloud generation process to the second point cloud generation part 272. When receiving the stop command, the second point cloud generation part 272 stops the second point cloud generation process executed at step S210 or step S220.

As described above, in the first embodiment, when the first point cloud PG1 obtained in the first analysis process by the first point cloud generation part 271 satisfies a predetermined condition of success, the second point cloud generation process is stopped. In this manner, the second point cloud generation process taking the longer process time than the first point cloud generation process may be stopped in the middle and the time until the entire process is completed can be shortened.

"Condition of success" in the first embodiment includes two conditions that (i) the point cloud generation rate of the first point cloud PG1 is equal to or larger than the predetermined threshold value and (ii) the number of detected objects detected using the first point cloud PG1 is equal to or larger than the predetermined threshold value. Note that another condition of success may be used. Or, only one of the conditions (i), (ii) may be used as the condition of success, or one or both of the conditions (i), (ii) and another condition added thereto may be used as the condition of success. It is preferable that the condition of success may be set to include that the point cloud generation rate of the first point cloud PG1 is equal to or larger than the predetermined threshold value. In this manner, the second point cloud generation process is stopped when the number of points contained in the first point cloud PG1 is sufficiently large and it is highly possible to detect the objects from the first point cloud PG1 with sufficient accuracy, and thus, there is an advantage that the entire process time may be significantly shortened.

After the stop command of the second point cloud generation process is issued, the object detection unit 270 outputs the detection result using the first point cloud PG1 at step S180. Specifically, for example, the detection result of the parts PP as the objects is provided from the object detection unit 270 to the robot control unit 211, and the robot control unit 211 executes the gripping operation of the parts PP using the detection result.

As described above, in the first embodiment, the second point cloud generation part 272 starts the second point cloud generation process after the first imaging process by the first point cloud generation part 271 and stops the second point cloud generation process if the first point cloud PG1 obtained in the first analysis process by the first point cloud generation part 271 satisfies the predetermined condition of success. Therefore, the second point cloud generation process may be stopped in the middle in the case where the objects may be detected with sufficient accuracy using the first point cloud PG1, and the time until the entire process is completed can be shortened.

Further, in the first embodiment, the stereo block matching method is used as the first depth measuring method, and the phase shifting method or spatial coding method may be used as the second depth measuring method. In the stereo block matching method, the depth may be obtained in a shorter time. On the other hand, in the phase shifting method and the spatial coding method, the depth may be obtained with higher accuracy. The phase shifting method and the spatial coding method require the larger number of times of imaging than the stereo block matching method. Accordingly, the second point cloud generation process is stopped when the first point cloud PG1 satisfies the predetermined condition of success, and thereby, the entire process time may be significantly shortened.

As the combination of the first depth measuring method and the second depth measuring method, various other combinations than the above described combination can be used. For example, the phase shifting method may be used as the first depth measuring method and the spatial coding method may be used as the second depth measuring method. Note that it is preferable that the process time of the first analysis process using the first depth measuring method is shorter than the process time of the entire second point cloud generation process using the second depth measuring method, and particularly, it is preferable that the first point cloud generation process is completed in a shorter time than the second point cloud generation process. In this manner, the shortening effect of the process time by stoppage of the second point cloud generation process when the first point cloud satisfies the predetermined condition of success is remarkable.

B. Second Embodiment

Figure 9:
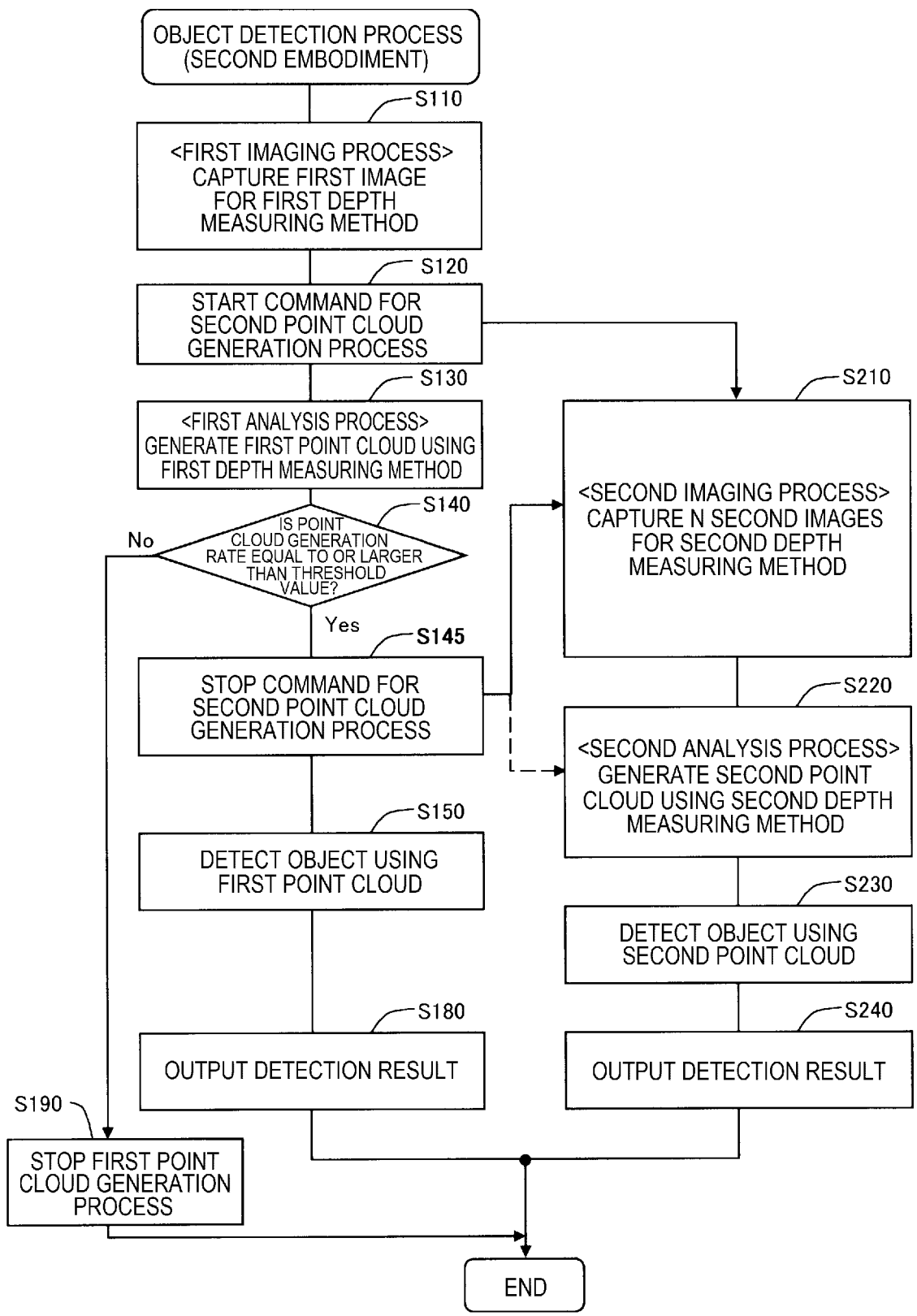
FIG. 9 is a flowchart showing a procedure of an object detection process in the second embodiment.

FIG. 9 is a flowchart showing a procedure of an object detection process in the second embodiment. In the second embodiment, steps S160, S170 in FIG. 8 are omitted and step S145 is added between step S140 and step S150, and the rest of the process procedure and the apparatus configuration are the same as those of the first embodiment.

In the second embodiment, at step S140, if the determination that the point cloud generation rate of the first point cloud PG1 is equal to or larger than the predetermined threshold value is made, at step S145, the first point cloud generation part 271 issues a stop command of the second point cloud generation process to the second point cloud generation part 272. In other words, in the second embodiment, as the condition of success to be satisfied by the first point cloud PG1, only the condition that the point cloud generation rate of the first point cloud PG1 is equal to or larger than the predetermined threshold value is used. In this manner, the second point cloud generation process may be stopped earlier than that in the first embodiment, and the entire process time can be significantly shortened. On the other hand, like the first embodiment, as the condition to be satisfied by the first point cloud PG1, the condition of success is formed to include the two conditions that (i) the point cloud generation rate of the first point cloud PG1 is equal to or larger than the predetermined threshold value and (ii) the number of detected objects detected using the first point cloud PG1 is equal to or larger than the predetermined threshold value, and thereby, there is an advantage that the object detection may be performed more reliably with the shortened process time.

C. Third Embodiment

Figure 10:
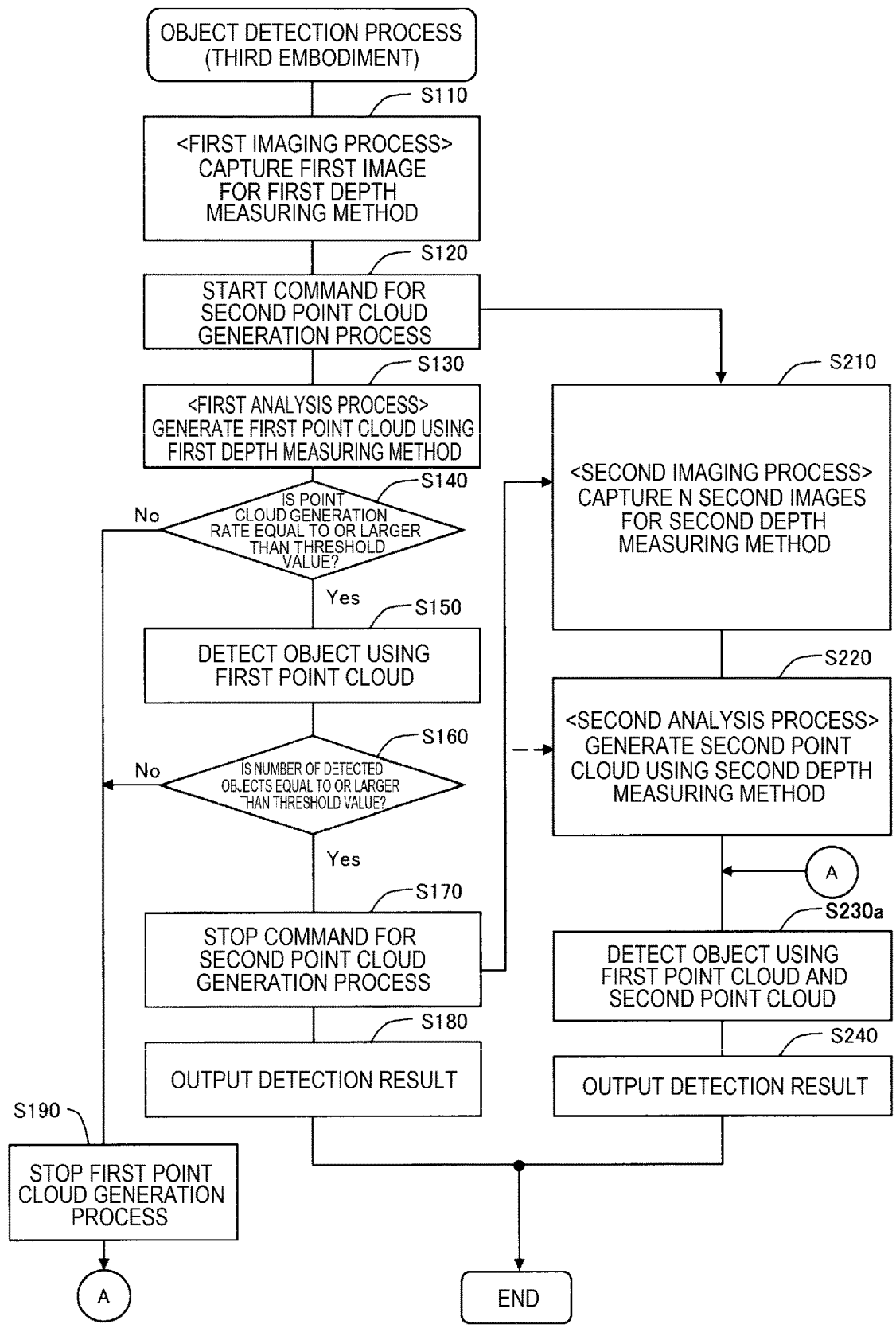
FIG. 10 is a flowchart showing a procedure of an object detection process in the third embodiment.

FIG. 10 is a flowchart showing a procedure of an object detection process in the third embodiment. In the third embodiment, the procedure is changed to move to step S230a when the first point cloud generation process is stopped at step S190 in FIG. 8, and the rest of the process procedure and the apparatus configuration are the same as those of the first embodiment.

At step S230a, the object detection execution part 273 detects the three-dimensional shapes of the parts PP as the objects using both the first point cloud PG1 and the second point cloud PG2. In the third embodiment, when the second point cloud generation process is not stopped and the second point cloud PG2 is generated, the object detection is executed using both the first point cloud PG1 and the second point cloud PG2, and thus, there is an advantage that the objects may be detected with high accuracy.

Note that the third embodiment can be applied to the above described second embodiment. That is, the process procedure of the second embodiment may be changed to move to step S230a in FIG. 10 after step S190 in FIG. 9.

D. Other Embodiments

The invention is not limited to the above described embodiments, but may be realized in various aspects without departing from the scope of the invention. For example, the invention can be realized in the following aspects. The technical features in the above described embodiments corresponding to the technical features in the following respective aspects can be appropriately replaced or combined for solving part or all of the problems of the invention or achieving part or all of the advantages of the invention. Further, if the technical features are not described as essential features in the specification, the features can be appropriately eliminated.

(1) According to a first aspect of the invention, a control apparatus that executes detection of an object is provided. The control apparatus has a first point cloud generation part that executes a first point cloud generation process including a first imaging process of capturing a first image by imaging the object with a camera according to a first depth measuring method and a first analysis process of generating a first point cloud representing positions of a plurality of pixels within the first image in three-dimensional coordinates, a second point cloud generation part that executes a second point cloud generation process including a second imaging process of capturing a second image by imaging the object with the camera according to a second depth measuring method and a second analysis process of generating a second point cloud representing positions of a plurality of pixels within the second image in the three-dimensional coordinates, and an object detection execution part that detects the object using at least one of the first point cloud and the second point cloud. The first point cloud generation process is a process completed in a shorter time than the second point cloud generation process, and the second point cloud generation part starts the second point cloud generation process after the first imaging process by the first point cloud generation part and stops the second point cloud generation process if the first point cloud obtained in the first analysis process satisfies a predetermined condition of success. According to the control apparatus, the second point cloud generation process is stopped if the first point cloud satisfies the predetermined condition of success, and thereby, the second point cloud generation process may be stopped in the middle in the case where the object may be detected with sufficient accuracy using the first point cloud and the time until the entire process is completed can be shortened.

(2) In the control apparatus, the first depth measuring method may be a stereo block matching method. According to the control apparatus, the depth may be obtained in a shorter time using the first depth measuring method.

(3) In the control apparatus, the first point cloud generation part may execute the first imaging process with a random dot pattern projected on the object. According to the control apparatus, the first image is imaged with the random dot pattern projected on the object, and thereby, the first point cloud may be captured with higher accuracy.

(4) In the control apparatus, the second depth measuring method may be a phase shifting method or spatial coding method. According to the control apparatus, the depth may be obtained with higher accuracy using the second depth measuring method.

(5) In the control apparatus, the condition of success may include a condition that a point cloud generation rate obtained by division of the number of points contained in the first point cloud by the number of pixels of the first image is equal to or larger than a predetermined threshold value. According to the control apparatus, the second point cloud generation process is stopped when the number of points contained in the first point cloud is sufficiently large and the object may be detected from the first point cloud with sufficient accuracy, and thereby, the entire process time may be significantly shortened.

(6) In the control apparatus, the first image may contain a plurality of objects of the same kind, and the condition of success may further include a condition that the number of objects detected by the object detection execution part using the first point cloud is equal to or larger than a predetermined number threshold value. According to the control apparatus, the second point cloud generation process is stopped when the plurality of objects contained in the first image may be detected from the first point cloud with sufficient accuracy, and thereby, the entire process time may be significantly shortened.

(7) In the control apparatus, when the second point cloud generation process is not stopped and the second point cloud is generated, the object detection execution part may execute the object detection using both the first point cloud and the second point cloud. According to the control apparatus, both the first point cloud and the second point cloud are used, and thereby, the object may be detected with high accuracy.

(8) According to a second aspect of the invention, a control apparatus that executes detection of an object is provided. The control apparatus includes a processor. The processor executes a first point cloud generation process including a first imaging process of capturing a first image by imaging the object with a camera according to a first depth measuring method and a first analysis process of generating a first point cloud representing positions of a plurality of pixels within the first image in three-dimensional coordinates, a second point cloud generation process including a second imaging process of capturing a second image by imaging the object with the camera according to a second depth measuring method and a second analysis process of generating a second point cloud representing positions of a plurality of pixels within the second image in the three-dimensional coordinates, and an object detection process of detecting the object using the first point cloud or the second point cloud. The first point cloud generation process is a process completed in a shorter time than the second point cloud generation process, and the processor starts the second point cloud generation process after the first imaging process and stops the second point cloud generation process if the first point cloud obtained in the first analysis process satisfies a predetermined condition of success. According to the control apparatus, the second point cloud generation process is stopped if the first point cloud satisfies the predetermined condition of success, and thereby, the second point cloud generation process may be stopped in the middle in the case where the object may be detected with sufficient accuracy using the first point cloud and the time until the entire process is completed can be shortened.

(9) According to a third aspect of the invention, a robot connected to the control apparatus is provided. According to the robot, the detection of the object to be processed by the robot can be performed in a shorter time.

(10) According to a fourth aspect of the invention, a robot system including a robot and the control apparatus connected to the robot is provided. According to the robot system, the detection of the object to be processed by the robot can be performed in a shorter time.

(11) According to a fifth aspect of the invention, a method of executing detection of an object is provided. The method has executing a first point cloud generation process including a first imaging process of capturing a first image by imaging the object with a camera according to a first depth measuring method and a first analysis process of generating a first point cloud representing positions of a plurality of pixels within the first image in three-dimensional coordinates, executing a second point cloud generation process including a second imaging process of capturing a second image by imaging the object with the camera according to a second depth measuring method and a second analysis process of generating a second point cloud representing positions of a plurality of pixels within the second image in the three-dimensional coordinates, and detecting the object using the first point cloud or the second point cloud. The first point cloud generation process is a process completed in a shorter time than the second point cloud generation process, and the second point cloud generation process is started after the first imaging process and the second point cloud generation process is stopped if the first point cloud obtained in the first analysis process satisfies a predetermined condition of success. According to the method, the second point cloud generation process is stopped if the first point cloud satisfies the predetermined condition of success, and thereby, the second point cloud generation process may be stopped in the middle in the case where the object may be detected with sufficient accuracy using the first point cloud and the time until the entire process is completed can be shortened.

The entire disclosure of Japanese Patent Application No. 2018-042505, filed Mar. 9, 2018 is expressly incorporated by reference herein.

What is claimed is:

1. A control apparatus that executes detection of an object, comprising a processor,
   the processor is configured to execute:
   a first point cloud generation process including
      a first imaging process that is acquiring a first image by capturing an image of the object with a camera according to a first depth measuring method, and
      a first analysis process that is generating a first point cloud representing three-dimensional positions which correspond to a plurality of pixels in the first image;
   a second point cloud generation process including
      a second imaging process that is acquiring a second image by capturing an image of the object with the camera according to a second depth measuring method, and
      a second analysis process that is generating a second point cloud representing three-dimensional positions which correspond to a plurality of pixels in the second image,
   wherein a process time of the first point cloud generation process is shorter than a process time of the second point cloud generation process, and
   the processor starts the second point cloud generation process after the first imaging process is started and discontinues the second point cloud generation process prior to completion if the first point cloud obtained in the first analysis process satisfies a predetermined condition of success; and
   an object detection process that detects the object using one of the first point cloud and the second point cloud.

2. The control apparatus according to claim 1, wherein the first depth measuring method is a stereo block matching method.

3. The control apparatus according to claim 2, wherein the processor executes the first imaging process with projecting a random dot pattern on the object.

4. The control apparatus according to claim 1, wherein the second depth measuring method is a phase shifting method or spatial coding method.

5. The control apparatus according to claim 1, wherein the predetermined condition of success includes a condition that a point cloud generation rate is equal to or larger than a predetermined threshold value, the point cloud generation rate is obtained by division of the number of points contained in the first point cloud by the number of pixels of the first image.

6. The control apparatus according to claim 5, wherein the first image contains a plurality of objects of the same kind, and
   the condition of success further includes a condition that the number of objects detected by the processor using the first point cloud is equal to or larger than a predetermined number threshold value.

7. The control apparatus according to claim 1, wherein, when the processor continues the second point cloud generation process and completes the generation of the second point cloud, the processor executes the object detection with using both the first point cloud and the second point cloud.

8. A robot system comprising:
   a robot; and
   the control apparatus according to claim 1 controls the robot based on the detection of the object.

9. A method of executing detection of an object, comprising:

executing a first point cloud generation process including
  a first imaging process that is acquiring a first image by capturing an image of the object with a camera according to a first depth measuring method, and
  a first analysis process of generating a first point cloud representing three-dimensional positions which correspond to a plurality of pixels in the first image;
executing a second point cloud generation process including
a second imaging process that is acquiring a second image by capturing an image of the object with the camera according to a second depth measuring method, and
a second analysis process that is generating a second point cloud representing three-dimensional positions which correspond to a plurality of pixels in the second image,
wherein a process time of the first point cloud generation process is shorter than a process time of the second point cloud generation process, and
the second point cloud generation process is started after the first imaging process is started and the second point cloud generation process is discontinued prior to completion if the first point cloud obtained in the first analysis process satisfies a predetermined condition of success; and
detecting the object using one of the first point cloud and the second point cloud.

10. The method according to claim 9, wherein the first depth measuring method is a stereo block matching method.

11. The method according to claim 10, further comprising executing the first imaging process with projecting a random dot pattern on the object.

12. The method according to claim 9, wherein the second depth measuring method is a phase shifting method or spatial coding method.

13. The method according to claim 9, wherein the predetermined condition of success includes a condition that a point cloud generation rate is equal to or larger than a predetermined threshold value, the point cloud generation rate is obtained by division of the number of points contained in the first point cloud by the number of pixels of the first image.

14. The method according to claim 13, wherein the the first image contains a plurality of objects of the same kind, and
  the condition of success further includes a condition that the number of objects detected using the first point cloud is equal to or larger than a predetermined number threshold value.

15. The method according to claim 9, further comprising detecting the object using both the first point cloud and the second point cloud when the second point cloud generation process continues and the second point cloud is generated.

* * * * *